United States Patent [19]
Dinand et al.

[11] Patent Number: 5,964,983
[45] Date of Patent: Oct. 12, 1999

[54] MICROFIBRILLATED CELLULOSE AND METHOD FOR PREPARING A MICROFIBRILLATED CELLULOSE

[75] Inventors: Elisabeth Dinand, Grenoble; Henri Chanzy, La Tronche; Michel R. Vignon, Meylan; Alain Maureaux, Guichainville; Isabelle Vincent, Evreux, all of France

[73] Assignee: General Sucriere, France

[21] Appl. No.: 08/875,028

[22] PCT Filed: Feb. 7, 1996

[86] PCT No.: PCT/FR96/00205

§ 371 Date: Jul. 16, 1997

§ 102(e) Date: Jul. 16, 1997

[87] PCT Pub. No.: WO96/24720

PCT Pub. Date: Aug. 15, 1996

[30]    Foreign Application Priority Data

Feb. 8, 1995 [FR] France .................................. 95 01460
Oct. 2, 1995 [FR] France .................................. 95 11555

[51] Int. Cl.$^6$ ...................................................... D21B 1/04
[52] U.S. Cl. ............................ 162/27; 162/76; 162/187; 426/573
[58] Field of Search ................................ 162/26, 27, 76, 162/182, 158, 173, 187; 426/94, 572, 573, 659

[56]    References Cited

U.S. PATENT DOCUMENTS

| | | | |
|---|---|---|---|
| 4,481,076 | 11/1984 | Herrick | 162/158 |
| 4,481,077 | 11/1984 | Herrick | 162/158 |
| 4,649,113 | 3/1987 | Gould | 162/158 |

FOREIGN PATENT DOCUMENTS

| | | |
|---|---|---|
| 0102829 | 3/1984 | European Pat. Off. . |
| 0120471 | 10/1984 | European Pat. Off. . |
| 0415193 | 3/1991 | European Pat. Off. . |
| 2472628 | 4/1986 | France . |
| 2066145 | 7/1981 | United Kingdom . |
| 03286 | 8/1984 | WIPO . |
| 11182 | 6/1993 | WIPO . |

*Primary Examiner*—Dean T. Nguyen
*Attorney, Agent, or Firm*—Morgan & Finnegan, L.L.P.

[57]    ABSTRACT

A microfibrillated cellulose containing at least around 80% of primary walls and loaded with carboxylic acids, and a method for preparing same, in particular from sugar beet pulp, wherein the pulp is hydrolysed at a moderate temperature of 60–100° C.; at least one extraction of the cellulose material is performed using a base having a concentration of less than 9 wt. %; and the cellulose residue is homogenised by mixing, grinding or any high mechanical shear processing, whereafter the cell suspension is fed through a small-diameter aperture, and the suspension is subjected to a pressure drop of at least 20 MPa and high-speed sheer action followed by a high-speed deceleration impact. The cellulose is remarkable in that a suspension thereof can easily be recreated after it has been dehydrated.

24 Claims, 3 Drawing Sheets

MICROFIBRILLATED CELLULOSE AND METHOD FOR PREPARING A MICROFIBRILLATED CELLULOSE

BACKGROUND OF THE INVENTION

The present invention concerns a novel parenchymal cellulose and a process for its production. More particularly, the present invention concerns a novel microfibrillated cellulose and a process for its production from primary wall plant pulp, particularly from sugar beet pulp after extraction of saccharose.

Cellulose is a substance of great industrial importance which has numerous applications, including:
- alimentary applications as a thickener to stabilize dispersions, emulsions and suspensions, for low calorie food products, low fat or low cholesterol food products, etc;
- industrial applications, in paints, paper, textiles, agriculture, cosmetics, etc;
- pharmaceutical applications, such as an excipient for medication, a precipitation control agent, ointment or cream support, intestinal transport agent, etc.

Until now, all known celluloses have had disadvantages. WO 93/11182 from Weyerhaeuser describes a bacterial cellulose with a reticulated structure. Apart from being very expensive, such a bacterial cellulose can cause contamination problems in alimentary applications.

FR-A-2 472 628 from ITT INDUSTRIES describes a microfibrillated cellulose essentially constituted by secondary walls obtained from wood pulp. Such a cellulose cannot easily be taken up into suspension once dehydrated. this causes considerable storage and transport problems due to the fact that the suspensions have a maximum cellulose content of about 4%.

In attempting to overcome that disadvantage, EP-A-0 120 471 from ITT INDUSTRIES describes a redispersable dried secondary wall (since it is obtained from wood pulp) microfibrillated cellulose which is characterized by the presence of an additive which prevents the formation of hydrogen bonds between the cellulose fibrils. The quantity of additive is considerable (at least 50% by weight with respect to the cellulose, and preferably at least the same quantity thereof). The additive is, for example, a polyhydroxylated compound such as a sugar containing 5 to 6 carbon atoms or a glycol, a borate or an alkaline phosphate, an aprotic solvent, an amine or a quaternary ammonium compound. Apart from the fact that the designation "cellulose" is improperly assigned to a product which is at most half cellulose, this "cellulose" is costly and is not suitable for all applications. Further, without the addition of additives this cellulose can only recover from 2% to a maximum of 20% of its initial viscosity after drying. Maintaining the viscosity requires the presence of an additive in an amount by weight which is substantially the same as that of the cellulose.

EP-A-0 102 829 from Weibel describes a process for simultaneously isolating the cellulosic and hemicellulosic constituents of sugar beet pulp. However, as with FR-A-2 472 628 cited above, once dehydrated, the parenchymal cellulose obtained cannot readily be taken up again into suspension, causing the same storage and transport problems.

Further, the economic exploitation of plant residues, in particular sugar beet pulp, is of great industrial importance.

One aim of the present invention is to provide a microfibrillated cellulose which can be taken up into suspension after dehydration without adding an additive.

Another aim of the invention is to provide a microfibrillated cellulose which regains almost all of its initial viscosity after drying, without adding an additive.

A further aim of the invention is to provide a process for the production of cellulose by economic exploitation of primary wall plant residues, in particular sugar beet pulp.

The present invention achieves all these three aims.

Further aims and advantages of the invention will become apparent from the description below.

THE INVENTION

In general, native cellulose is always in a microfibrillate form, these microfibrils being associated to a greater or lesser degree to form fibers, walls and membranes. Each cellulosic microfibril is constituted by a rigorous assembly of parallel cellulose chains resulting from the method by which the cellulose is biosynthesized. Cellulose microfibrils are generally considered to contain only a few faults along their axis. Their mechanical properties are close to the theoretical mechanical properties of cellulose: a tenacity in the order of 130 GPa and a fracture toughness in the order of 13 GPa. Cellulosic microfibrils are thus of interest if they can be dissociated and reformed.

Cellulose microfibrils are usually associated to a high degree in walls or fibers. The microfibrils in secondary walls are organized into highly oriented layers which form a fiber which cannot be dissociated; the microfibrils in primary walls are deposited in a disorganized fashion. The parenchyma is a typical example of primary wall tissue. While it is difficult, if not impossible, to separate secondary wall cellulose microfibrils without damaging them, it is easy to dissociate primary wall microfibrils, not only because of their looser organization but also because interstitial polysaccharides, which are usually charged, constitute a large percentage of these walls.

Examples of parenchyma are sugar beet pulp, citrus fruits (lemons, oranges, grapefruit) and the majority of fruits and vegetables. An example of secondary wall plant matter is wood.

The microfibrils of primary walls can be unravelled using a mechanical shear operation which would break the fibers of secondary walls to produce microfibrils. In other words, microfibrils can only be obtained from secondary walls by breaking the original fibers.

Primary wall cellulose is thus a material with great potential.

The present invention will be illustrated with reference to sugar beet pulp.

Sugar beet pulp is principally constituted by parenchyma and thus by primary wall cells.

The composition by weight of solid sugar beet pulp can vary depending on the origin of the pulp and the cultivation conditions. In general, the pulp contains:
- 15% to 30% cellulose;
- 12% to 30% pectins;
- 12% to 30% hemicelluloses;
- 2% to 6% proteins;
- 2% to 6% mineral materials;
- 2% to 6% lignin, tannins, polyphenols and ferulic ester.

The treatment of sugar beet pulp to isolate cellulose from parenchymatic cells has already been proposed. EP-A-0 102 829 cited above concerns such a process and describes:
- suspending the sugar beet pulp in an acidic (pH<4.5) or basic (pH>10.0) aqueous medium;

heating the suspension to a temperature of more than 125° C. (0.5 MPa);

keeping the suspension at a temperature of more than 125° C. for a period of between 15 seconds and 360 seconds;

subjecting the heated suspension to mechanical shearing in a tube reactor followed by rapid depressurization through small orifices into a zone which is at atmospheric pressure;

filtering the suspension and recovering the insoluble fraction which contains the parenchyma cellulose and the soluble fraction (filtrate) which contains the hemicelluloses;

treating the cellulose fraction by bleaching with sodium hypochlorite and mechanical defibrlllation to produce a parenchyma cellulose paste constituted by cell wall fragments.

As mentioned above, once dehydrated, the cellulose obtained using the process of EP-A-0 102 829 cannot easily be taken up into suspension.

The present invention provides a process for the production of microfibrillated cellulose from primary wall plant pulp, in particular sugar beet pulp after saccharose extraction, comprising the following steps:

(a) acid or basic hydrolysis of the pulp partially to extract the pectins and hemicelluloses;

(b) recovering a solid residue from the suspension from step (a);

(c) carrying out, under alkaline conditions, a second extraction of the residue of cellulosic material from step (b), this step being obligatory if step (a) is acidic and optional if step (a) is basic;

(d) if necessary, recovering the cellulosic material residue by separating the suspension from step (c);

(e) washing the residue from step (b) or step (d);

(f) optionally, bleaching the cellulosic material from step (e);

(g) recovering the cellulosic material by separating the suspension from step (f);

(h) diluting the cellulosic material from step (g) in water to obtain between 2% and 10% of dry matter;

(i) homogenizing the cell suspension from step (h); characterized in that (j) step (a) is carried out at a temperature between about 60° C. and 100° C., preferably between about 70° C. and 95° C., more preferably at about 90° C.;

(jj) at least one alkaline extraction step (a) and/or (c) is carried out on the cellulosic material, salid alkaline extraction being carried out with a base, preferably selected from caustic soda and potash, the concentration thereof being less than about 9% by weight, preferably between about 1% and 6% by weight;

(jjj) homogenizing step (i) is carried out by mixing or grinding or any high mechanical shear operation followed by passing the cell suspension through a small diameter orifice and subjecting the suspension to a pressure drop of at least 20 MPa and to a high velocity shearing action followed by a high velocity decelerating impact.

Conditions (j), (jj) and (jjj) are novel. It will be shown below that they can produce a novel primary wall cellulose with unique structural, morphological, chemical and rheological properties.

In step (a), the term "pulp" means moist, dehydrated, silo stored or partially depectinized pulp.

Extraction step (a) can be carried out in an acidic medium or in a basic medium.

For acidic extraction, the pulp is suspended in water for several minutes to homogenize the acidified suspension at a pH which is between 1 and 3, preferably between 1.5 and 2.5, with a concentrated solution of an acid such as hydrochloric acid or sulfuric acid.

For basic extraction, the pulp is added to an alkaline solution of a base, for example caustic soda or potash, with a concentration of less than 9% by weight, preferably less than 6% by weight, more particularly between 1% and 2% by weight. A small amount of a water-soluble anti-oxidizing agent such as sodium sulfite $Na_2SO_3$ can be added to limit cellulose oxidization reactions.

In accordance with the invention, step (a) is carried out at a "moderate" temperature, between about 60° C. and 100° C., preferably between about 70° C. and 95° C., more preferably at about 90° C. This is in contrast to the very high temperatures (>125° C.) used in the prior art. The duration of step (a) is between about 1 hour and about 4 hours. During step (a) of the invention, partial hydrolysis occurs with liberation and solubilization of the pectins and hemicelluloses while conserving the molecular weight of the cellulose.

In step (b), the solid residue is recovered from the suspension from step (a).

When the first extraction (a) is acid hydrolysis, the second extraction step (c) is obligatory and is carried out under basic conditions. When the first extraction step (a) is basic hydrolysis, the second extraction step (c) is optional.

Thus, if necessary, the cellulosic material residue from step (b) undergoes a second extraction step in step (c). This latter step is an alkaline extraction step.

Thus the process of the present invention always includes at least one alkaline extraction step.

In accordance with the present invention, each alkaline extraction step—namely the alkaline extraction step of optional step (c) and/or the extraction of step (a), if it is basic—must be carried out with a base, said base preferably being selected from caustic soda and potash, the concentration thereof being less than about 9% by weight, preferably between about 1% and about 6% by weight.

The applicant has shown that carrying out each alkaline extraction step employing the conditions of the process of the invention avoids the irreversible transformation:

cellulose I→cellulose II

This transformation would destroy the microfibrillar structure necessary for the specific properties of the product of the invention.

The duration of each alkaline extraction step is between about 1 hour and about 4 hours, preferably about 2 hours.

In step (d), the solid residue is recovered from optional step (c).

In step (e), the residue from step (b) or step (d) is washed with copious quantities of water to recover the cellulosic material residue.

In accordance with the invention, a certain percentage of the non cellulosic acidic polysaccharides (pectins, hemicelluloses) is retained at the surface of the cellulose microfibrils, having the effect of preventing them from associating with each other. This percentage of acidic polysaccharides is in general less than about 30% by weight, preferably less than 5% by weight. Too high a quantity of acidic polysaccharides would necessitate homogenization periods which were too long, but in accordance with the invention, this percentage must be greater than 0%.

The cellulosic material of step (e) is then optionally bleached in step (f), for example with sodium chlorite, sodium hypochlorite, 5–20% dry matter hydrogen peroxide, etc, in a manner that is known in itself. Different concentrations can be used at temperatures between about 18° C. and 80° C., preferably between about 50° C. and 70° C. The duration of step (f) is between about 1 hour and about 4 hours, preferably between about 1 hour and about 2 hours. A cellulosic material containing between 85% and 95% by weight of cellulose is obtained in this way.

In step (h), the suspension from step (e), optionally bleached in step (f), is diluted again in water to 2% to 10% dry matter, then sent to step (i) which, in accordance with the invention, is carried out by mixing or grinding using any high mechanical shear operation, followed by passing the cell suspension through a small diameter orifice, subjecting the suspension to a pressure drop of at least 20 MPa and to a high velocity shearing action followed by a high velocity decelerating impact.

Mixing or grinding is, for example, carried out by passage through a mixer or grinder for a period of several minutes to about one hour, in an apparatus such as a WARING blender provided with a four blade screw, or a mixing mill or any other type of grinder such as a colloidal mill, under the following conditions: the concentration of dry cellulose material is in the range 2% to 10% by weight. During mixing or grinding, the suspension heats up. The receptacle is preferably provided with a system of deflecting ribs by means of which the liquid is moved back towards the blades of the screw at the center of the receptacle.

Homogenization proper is advantageously carried out in a MANTON GAULIN type homogenizer in which the suspension is subjected to a high velocity and high pressure shearing action in a narrow passage and against an impact ring. The homogenization conditions are as follows: after mixing or grinding, the concentration of dry pulp in the suspension is in the range 2% to 10% by weight. The suspension is preferably introduced into the homogenizer after preheating to a temperature between 40° C. and 120° C., preferably between 85° C. and 95° C. The temperature of the homogenization operation is kept between 95° C. and 120° C., preferably above 100° C. In the homogenizer, the suspension is subjected to pressures which are between 20 MPa and 100 MPa, preferably more than 50 MPa.

The cellulose suspension is homogenized in between 1 and 20, preferably between 2 and 5, passes until a stable suspension is obtained.

It should be noted that homogenization in the context of the present invention has a function which is different to that in the ITT INDUSTRIES patents cited above, namely FR-A-2 472 628 and EP-A-0 120 471. In the process of the present invention, the function of the homogenization step is to unravel the microfibrils without breaking them, while in the ITT INDUSTRIES patents mentioned above, the function of the same step is to break the secondary wall fibers to obtain microfibrils.

The homogenization operation of step (i) is advantageously followed by a high mechanical shear operation, for example in an ULTRA TURRAX apparatus from SYLVERSON.

We have established that the treatment is more effective at higher dry matter concentrations in the suspension to be homogenized and at higher homogenization temperatures. This means that as the cellulose concentration increases, the number of passes required decreases. However, the viscosity of the suspension during treatment, which depends directly on the concentration of the treated suspension, is a limiting factor. In fact, the apparatus is not designed to operate with suspensions which are too viscous.

The applicant has established that special valves exist for cell grinding with which the number of passes can be reduced. Further, the number of passes will be reduced if water-soluble dispersing agents, suspending agents or thickening agents such as carboxymethylcellulose, cellulosic ethers, gelling polysaccharides (guar, carouba, alginates, carrageenans, xanthane and derivatives thereof) are added to the suspension to be homogenized.

Sugar beet pulp contains 4% to 6% of mineral compounds which are insoluble in water.

Soil residues and fairly large (>1 mm) pieces of grit are among the mineral compounds present in sugar beet pulp. The applicant has discovered calcium oxalate monohydrate and silica crystals in these insoluble mineral compounds. Calcium oxalate monohydrate is found inside the cells which are generally localized in the wood-and bast bundles near the vessels. The calcium oxalate crystals are contained in certain cells and constitute a form of calcium storage in the plant. The nature, quantities and proportions of these minerals can vary with the soil in which the plant is cultivated, the sugar beet variety, the climate during growth, etc.

The presence of calcium oxalate crystals causes a problem during homogenization as they are highly abrasive and it is preferable to eliminate them or at least to reduce their quantities substantially. Elimination can be carried out by treatment in an acidic medium, for example hydrochloric acid, e.g. acid extraction as could be carried out in step (a) (if that step is carried out under acidic conditions, of course), which transforms the calcium oxalate monohydrate into oxalic acid and calcium chloride, which are soluble in water.

Calcium oxalate can also be eliminated by mechanical blending and screening. The applicant has established that the concentration of residual minerals can be reduced by blending and screening the dehydrated pulp before step (a) and retaining only the fraction with a granulometry which is between about 20 $\mu$m and 1,000 $\mu$m, preferably between 75 $\mu$m and about 600 $\mu$m.

When the cellulosic residue contains a non-negligible quantity of free calcium oxalate crystals or calcium oxalate crystals which are inside the cells after basic extraction or after bleaching, moderate grinding can be carried out wet, for example in a WARING blender type mixer or any other grinder, to rupture the cells, followed by filtering or screening through a suitable screen. The screen mesh can readily be determined by the skilled person, for example between 20 $\mu$m and 75 $\mu$m, e.g. a 75, 60, 40 or 20 $\mu$m mesh, depending on the extent of mixing or grinding, i.e. depending on the size of the cell fragments obtained and industrial feasibility.

A further means of eliminating the calcium oxalate problem is to carry out an oxidation treatment, for example with ozone or hydrogen peroxide, associated with a bleaching treatment in step (f).

In order to eliminate the calcium oxalate crystals, bleaching step (f) can also be carried out using ozone or hydrogen peroxide.

Any of the means of eliminating or at least reducing the quantity of calcium oxalate crystals can be combined with each other or used separately, as can readily be determined by the skilled person in each particular case.

The microfibrillated cellulose obtained using the process of the present invention is cellulose I.

It is characterized in that it contains at least about 80%, more generally at least about 85%, of primary walls, and in that it is charged with carboxylic acids. The term "carboxylic acids" means simple carboxylic acids, their polymers and their salts. These carboxylic acids are generally uronic acids, such as galacturonic acid and glucuronic acid.

The microfibrillated cellulose of the present invention is remarkable in that it can be taken up into suspension after dehydration.

The microfibrillated cellulose of the invention is 15% to 50% crystalline.

It is constituted by microfibrils with a cross-section between about 2 nm and about 4 nm.

The microfibrillated cellulose of the present invention forms stable suspensions, of the liquid crystal type, constituted by nematic domains.

The microfibrillated cellulose of the present invention has a group of beneficial properties:

unique Theological properties such that stable suspensions can be produced at pHs in the range 2 to 12 and in a temperature range of 0° C. to 100° C. at a minimum concentration of 0.2% and with the appearance of a gel at concentrations of more than 1%.

The cellulose of the present invention behaves as a weak gel at 1% DM (dry matter) in water. Upon studying the oscillation viscoelastic behavior of the product in oscillation, it was found that G' and G" were stable in the frequency range and that G'=5G", G' being the elastic component of the system and G" being the viscous component. It should be noted that xanthane, for example, does not behave as a gel. The viscosity of the cellulose of the present invention at 20° C. is much higher than that of xanthane at 20° C. and equivalent to that of xanthane at 80–90° C.

Regarding viscosity, at 2% in water, the cellulose of the present invention has a shear rate of 1.8 s$^{-1}$ at a viscosity equivalent to high viscosity CMC at an identical concentration ($\approx$20 000 mPa.s). The cellulose of the present invention has a viscosity which is much higher than that of xanthane ($\approx$7,000 mPa.s). A mixture of 1.8% of the cellulose of the present invention and 0.2% of CMC in water has beneficial rheological properties as the solution reaches viscosities of more than 25,000 mPa.s.

The cellulose of the present invention is a rheofluidifying and thixotropic substance.

unique physical and chemical properties in that the cellulose is mainly constituted by cellulose associated with a residual amount of pectins or hemicelluloses which procure particular physical and chemical properties. The cellulose of the invention is constituted by microfibrils of the native or cellulose I type which are separated out to a greater or lesser degree.

very high chemical reactivity, very large accessible surface area;

excellent water retentive capacity;

high suspending capacity;

thickening capacity.

Produced by the above process, the cellulose of the invention can be concentrated, preferably to about 50% of dry matter, by precipitation, for example from an alcohol such as ethanol, isopropanol or any other similar alcohol, by a freeze-thaw process, by a pressing operation by passage through a filter press (which cannot be used with other hydrocolloids such as xanthane, CMC, etc), by filtering, by dehydration, by dialysis against a hygroscopic solution with a molecular size which is larger than the pore size of the membrane used or by using any other process known to the skilled person for concentrating such suspensions.

The cellulose, either directly from the process of the invention or after a concentration step, can be high or low energy dried by evaporation, dehydration, low temperature drying under controlled humidity, spray drying, drum drying, freeze drying or critical point drying, or by any other process which can obtain the product in its secondary state. Low temperature drying conditions under controlled humidity are particularly advantageous in this respect as they are gentle and energy costs are lower.

In contrast to the ITT INDUSTRIES patent EP 120 471, where the microfibrillated structure, without addition of additives, can only recover 2% to a maximum of 20% of its initial viscosity after drying (page 4, lines 38–42), the cellulose of the present invention recovers almost all of its initial viscosity after drying without adding any additives.

The cellulose of the present invention also has beneficial film-forming and strengthening properties.

When a suspension of microfibrils of the invention is applied to a surface, for example a metal, glass, ceramic, etc surface, and allowed to dry, the microfibrils form a film on the surface.

The cellulose of the present invention, spread in a thin layer, forms a film on dehydrating. The properties of the film are determined by measuring the corrected Young's modulus (Ecor), which gives the stiffness of the system. For example, Ecor=2,500 to 3,000 MPa at 25% humidity.

Wet paper sheets can also be treated during manufacture by a suspension of the cellulose of the invention, thus improving their physical properties, in particular their tensile strength.

In the non-alimentary field, there are many potential applications of the cellulose of the present invention:

for paints, it constituted a good thickening agent in the aqueous phase, and can replace hydroxy-propyl-celluloses, for example;

its film-forming and strengthening properties can be used in latex for paints, paper, adhesive coatings, etc.

Incorporating 1% to 15% of microfibrillated cellulose into latex (and other hydrosoluble products) or thermoplastic compounds or cellulose acetates after transforming the surface considerably improves the modulus of elasticity and tensile strength.

as a thickening agent which can be used in drilling muds.

In the cosmetics and paramedical fields, the microfibrillated cellulose of the present invention constitutes a thickening agent competitive with Carbopol or other thickening agents used in these fields. This product has the advantage of being less sticky than the others, considerably improving the rinse properties of the products and giving it a more agreeable feel.

In the papermaking industry, the following can be cited:

using the strengthening properties of microfibrillated cellulose by introducing it into the paper pulp;

combined use of the thickening, strengthening and film-forming properties of microfibrillated cellulose to coat certain special papers. The cellulose also has beneficial barrier properties.

The cellulose of the invention can also be deposited on the surface of paper to improve its opacity and uniformity.

The cellulose of the invention can be applied alone or with other compounds such as pigments and fillers which are normally used in the papermaking industry.

The strengthening properties of the cellulose would, for example, be employed by introducing it into the paper pulp.

In the alimentary field:

microfibrillated cellulose can stabilize emulsions, act as an aroma support, a gelling agent and especially as a thickening agent;

it can replace or act in synergy with other thickening agents already used in this field, such as xanthane, CMCs, or microcrystalline celluloses.

Synergistic use is particularly important from the economic point of view. It means that far less product can be used to achieve the same effect.

Examples of applications for microfibrillated cellulose in the alimentary field are fat substitutes, stabilization of mayonnaise, salad dressings, and in general all emulsions, ice creams, whipped creams, thickening agents for all types of beverages spreadable pastes, batters or leavened dough, milk desserts, meat products, etc.

For the same rheological effect, the cellulose of the present invention is much cheaper than xanthane and bacterial cellulose.

BRIEF DESCRIPTION OF THE DRAWINGS

The present invention will be illustrated in more detail by the following non-limiting examples which refer to the accompanying figures in which.

DESCRIPTION OF THE EMBODIMENTS

Figure 1:
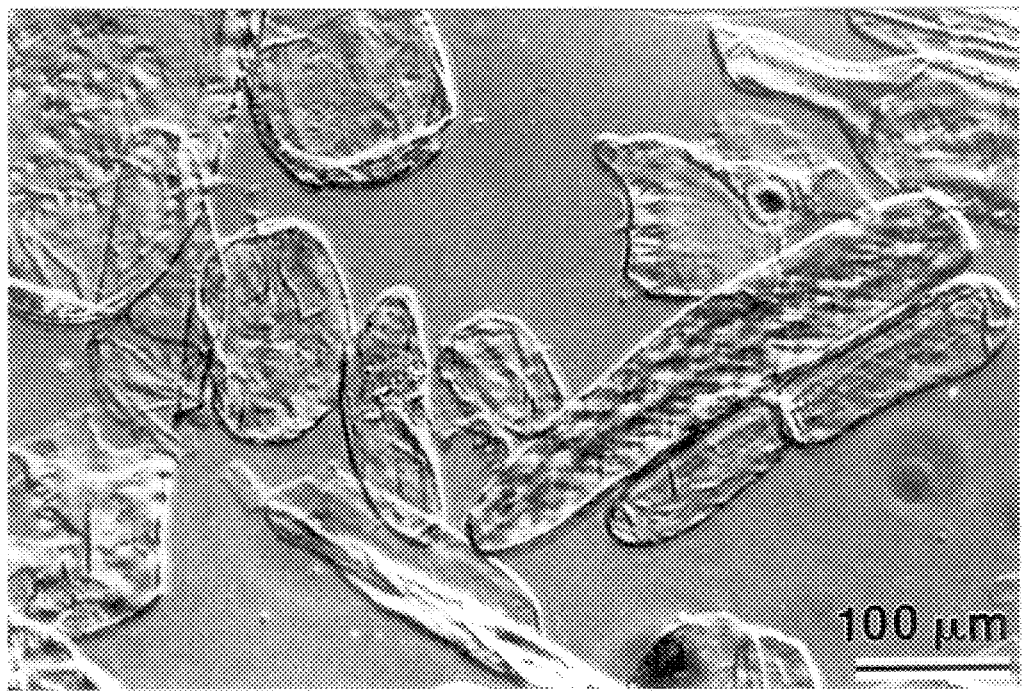
FIG. 1 is an optical microscope photograph of separate parenchyma cells.

EXAMPLE 1
Purification of Sugar Beet Pulp

Dehydrated pulp of sugar beet harvested from the Nassandres region of France was taken up into suspension in deionized water. For better hydration, a WARING blender type mixer provided with a four blade screw was used, and intermittent mixing was carried out for 45 minutes. The suspension was acidified to a pH of 2 by adding a solution of $H_2SO_4$. This suspension was kept at room temperature (25° C.) for 15 minutes then heated to 80° C. for 2 hours with constant mechanical stirring. The suspension was filtered through a metal screen and washed with copious quantities of water. The solid residue after washing was extracted with an alkaline solution. It was taken up into suspension in a caustic soda solution with a concentration adapted to produce a final caustic soda concentration of 2% by weight and a dry matter percentage of 2.5% by weight, both with respect to the total liquid. About 0.1% by weight of sodium bisulfite ($Na_2SO_3$) with respect to the total liquid was added. The suspension was heated to 80° C. for 2 hours with constant mechanical stirring. After this treatment, it was filtered through a 0.6 mm sieve. The solid residue was washed with water until a neutral filtrate was obtained.

After washing, the solid residue was taken up into a 2.5% suspension in a 3.4 g/l sodium chlorite solution ($NaClO_2$), buffered to a pH of 4.9 with a mixture of caustic soda and acetic acid. The suspension was heated to 70° C. for 3 hours with constant mechanical stirring. It was then filtered through a stainless steel screen and then rinsed with water until a colorless filtrate was obtained. A pale gray cellulosic residue with 3% to 5% by weight dry matter was obtained by filtering under reduced pressure using a Büchner funnel.

The neutral sugar composition of the solid residue was determined by chemical analysis based on gas chromatographic characterization of the alditzl acetates obtained after acid hydrolysis of the polysaccharides, reduction and acetylation of the sugar monomers. The alditol acetates were identified using GC and the sugars were measured using myoinositol as an internal reference, allowing for the specific response factors of each of the alditols. The chromatograph was a HEWLETT-PACKARD 5890 with a flame ionization detector connected to a HEWLETT-PACKARD 3395 integrator. An SP 2380 (0.53 mm×25 m) column was used with U nitrogen as the carrier gas.

The alditol acetates were eluted with retention times which were characteristic of the column. Studies were carried out to determine the response factor for each alditol acetate. Knowing the area and the quantity of starting inositol, then using the surface area of the peaks for each alditol acetate, the quantity of corresponding oses could be deduced and the percentages by weight of each neutral sugar monomer obtained with respect to the total mass of neutral sugars in the sample could be calculated. The glucose derived almost entirely from hydrolysis of the cellulose; the percentage of glucose thus gave an indication of the purity of the cellulose in the sample. The other neutral sugars were principally xylose, galactose, mannose, arabinose and rhamnose and provided an estimation of the quantities of residual pectins and hemicelluloses.

Chemical analysis of the resulting cellulose residue indicated 85% glucose.

EXAMPLE 2
Purification of Sugar Beet Pulp

The entire series of treatments of Example 1 was repeated, adding a second treatment with sodium chlorite identical to the first treatment after the sodium chlorite treatment and corresponding rinse steps. This produced a whitish cellulosic residue with a neutral sugar chemical composition which varied little during the second bleaching step. Chemical analysis indicated 86% glucose in the resulting cellulose residue.

EXAMPLE 3
Purification of Sugar Beet Pulp

Dehydrated pulp was taken up into suspension in deionized water and then acid hydrolyzed using the method described in Example 1. It was filtered and washed with water to eliminate the dissolved pectins and hemicelluloses. The solid residue was then extracted with an alkaline solution using the method described in Example 1. This alkaline treatment was carried out a second time. The solid residue was washed with water until a neutral filtrate was obtained before carrying out two successive bleaching steps using sodium chlorite and the method described in Example 1. Chemical analysis indicated 89% glucose.

Examples 1, 2 and 3 show that the larger the number of extraction steps, the purer the cellulose in the residue.

EXAMPLE 4
Purification of Sugar Beet Pulp

The entire series of treatments of Example 1 was repeated, substituting the sulfuric acid solution with a hydrochloric acid solution to bring the pH of the suspension to 2.

The cellulosic residue contained 90% glucose, similar to that obtained in Example 3.

EXAMPLE 5
Purification of Sugar Beet Pulp

Dehydrated pulp was taken up into suspension in deionized water. For better hydration, a WARING blender type mixer provided with a four blade screw was used, and intermittent mixing was carried out for 45 minutes. The suspension was rendered alkaline by addition of a caustic soda solution with a concentration adapted to obtain a final concentration of 2% by weight of caustic soda and a dry matter percentage of 2.5% by weight, both with respect to the total liquid. About 0.1% by weight of sodium bisulfite ($Na_2SO_3$) with respect to the total liquid was added. The suspension was heated to 80° C. for 2 hours with constant mechanical stirring. After this treatment, it was filtered through a 0.6 mm screen. The solid residue was washed with water until a neutral filtrate was obtained. This alkaline treatment was carried out a second time. The solid residue was washed with water until a neutral filtrate was obtained before carrying out two successive bleaching steps using sodium chlorite and the method described in Example 1.

Chemical analysis indicated 87% glucose.

EXAMPLE 6
Purification of Sugar Beet Pulp

The entire series of treatments of Example 5 was carried out, using three successive alkaline treatments with caustic soda with a concentration adapted to produce a final caustic soda concentration of 2% by weight in place of the two treatments of Example 5. The solid residue was washed with water until a neutral filtrate was obtained before carrying out two successive bleaching steps with sodium chlorite using the method described in Example 1.

Chemical analysis indicated 92% glucose.

EXAMPLE 7
Purification of Sugar Beet Pulp

The entire series of treatments of Example 5 was repeated, replacing the two alkaline treatments with caustic soda with two successive treatments with a potash solution with a concentration adapted to produce a final potash concentration of 2% by weight. The solid residue was washed with water until a neutral filtrate was obtained before carrying out two successive bleaching steps with sodium chlorite using the method described in Example 1. Using potash, cellulosic residues were obtained which had a purity similar to that obtained with caustic soda.

EXAMPLE 8
Influence of Caustic Soda Concentration

Dehydrated pulp was taken up into suspension in deionized water by mixing in identical fashion to that described in Example 1. The suspension obtained was heated under reflux for 20 minutes then filtered through a 0.6 mm screen. The solid residue was then taken up into suspension in a caustic soda solution with a concentration adapted to produce a final caustic soda concentration of 2% or 8% by weight and a dry matter content of 2.5% by weight, both with respect to the total liquid. This suspension was magnetically stirred for three hours at 20° C. After this treatment, it was filtered through a 0.6 mm. screen and washed with water until a neutral filtrate was obtained.

After extraction, the percentages of glucose obtained for treatment with 2% or 8% caustic soda were as shown in Table I:

TABLE I

Effect of caustic soda concentration on cellulose residue purity

| Caustic soda concentration | | % glucose |
| --- | --- | --- |
| by weight | molar | by weight |
| 2% | 0.5M | 48 |
| 8% | 2M | 58 |

It can thus be seen that during the first alkaline extraction step, the use of more concentrated caustic soda results in higher purity cellulose.

EXAMPLE 9
Influence of Caustic Soda Concentration

Dehydrated pulp was treated as in Example 6. The purified cellulosic residue produced a 4% paste after filtering under reduced pressure using a Büchner funnel which was simultaneously treated in similar fashion in eight separate experiments. 50 ml of a 2%, 7%, 9%, 9.5%, 10%, 12%, 14% and 17% by weight caustic soda solution was added to 0.6 grams of this sample. Treatment was carried out at a temperature T=20° C. with constant magnetic stirring for 2 hours. After neutralizing with hydrochloric acid and dialysis of these suspensions against distilled water, the residue was oven dried at 50° C. in small receptacles to obtain thin films of cellulosic residues for each experiment.

In other experiments, a drop of suspension after dialysis was deposited on an electron microscope grid and then dried before examination.

X-ray studies showed that films resulting from cellulose treated with 2% to 9% by weight caustic soda diffracted in identical fashion to that of the starting cellulose. These were identified as cellulose I (interferences at 0.54 nm, 0.4 nm and 0.258 nm) with a degree of crystallinity in the order of 35%. In contrast, for cellulose films treated with caustic soda at concentrations of 9.5% and above, a spectrum was obtained which was characteristic of cellulose II. It was characterized in particular by interferences at 0.7 nm, 0.44 nm, 0.4 nm and 0.258 nm.

Figure 2:
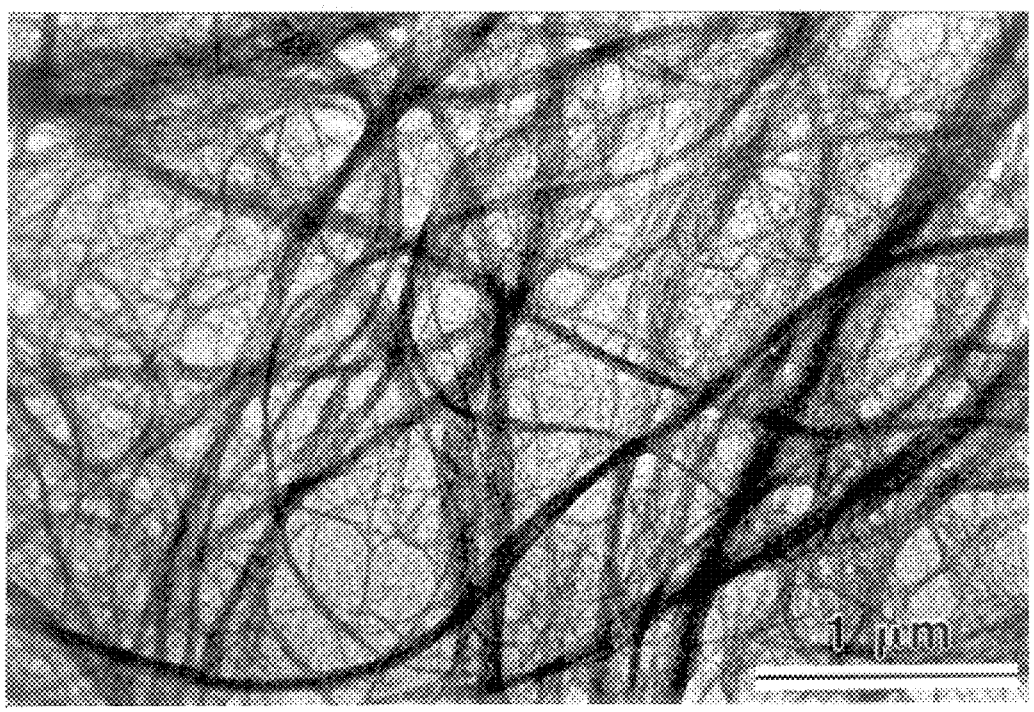
FIG. 2 is a transmission electron microscope photograph of native cellulose (cellulose I)
Figure 3:
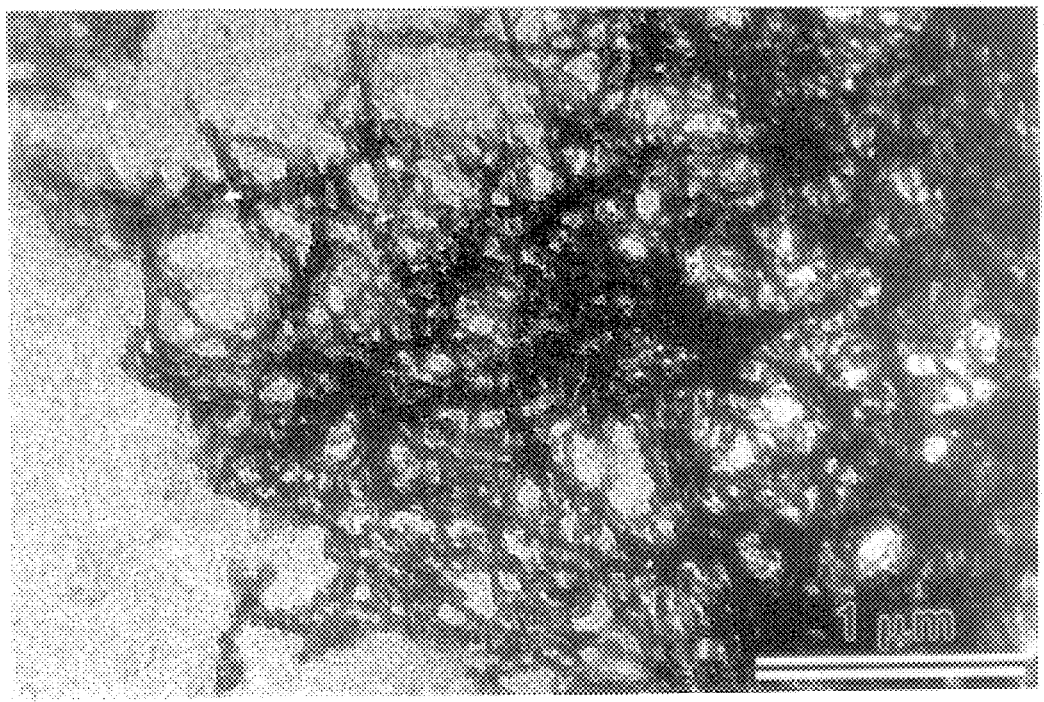
FIG. 3 is a transmission electron microscope photograph of cellulose II.

Electron microscopic examination established that the samples which had been treated with 2% to 9% caustic soda were in the form of entwined smooth cellulose microfibrils which could slide against each other (FIG. 2). In contrast, after treatment with caustic soda at 9.5% and above, the sample had agglomerated into microgel grains constituted by elements which had become welded together (FIG. 3). This transformed cellulose no longer had the characteristic properties of the cellulose of the invention.

In order to conserve the particular properties of the cellulose of the invention, the crystalline structure of the native cellulose must be preserved; thus if a caustic soda solution is used during the alkaline extraction step, a concentration of 9% must not be exceeded.

EXAMPLE 10
Elimination of Mineral Material

Before rehydration, the dried pulp was ground for ten minutes in a mixing mill provided with a 1 mm screen. Screening through 600 $\mu$m and 75 $\mu$m sieves at the mill outlet recovered one particle fraction with a size of less then 75 $\mu$m and a very large fraction between 75 $\mu$m and 600 $\mu$m. After calcining for 8 hours at 560° C., the ash mass was compared with the initial mass of the sample. This produced the amount of ash for each fraction: between 75 $\mu$m and 600

μm. a fraction comprising 5% of mineral material was isolated while below 75 μm a fraction comprising 12% of mineral material was isolated.

Thus grinding followed by screening produced a fraction which was depleted in mineral material.

EXAMPLE 11
Elimination of Mineral Material

The residues from the purification steps described in Examples 1 to 7 were mixed in a WARING blender at very high speed for three minutes after the bleaching step and then filtered through a 25 μm sieve. The effectiveness of such a treatment can be observed through an optical microscope as calcium oxalate crystals have the property of being birefringent when observed under polarized light. Before treatment, numerous crystals were observed between the cells on the bottom of the observation plate as well as crystals inside certain cells. After treatment, no more crystals could be seen between the cells on the bottom of the plates.

This example shows that the crystals can be eliminated, depending on the amount of mixing and washing through a screen of suitable porosity.

EXAMPLE 12
Effect of Homogenization

The suspensions from the treatments described in Examples 1 to 7 were suspensions of purified cells principally constituted by cellulose. Microscopic observation showed that cells were separated to a greater or lesser degree. These suspensions were passed through a GAULIN homogenizer at 40 MPa fifteen consecutive times at a concentration of 2% after preheating for one hour at 60° C. The temperature increased rapidly to 80° C. to 100° C.

Figure 4:
FIG. 4 is a transmission electron microscope photograph of a cell wall before homogenization in a Gaulin homogenizer.
Figure 5:
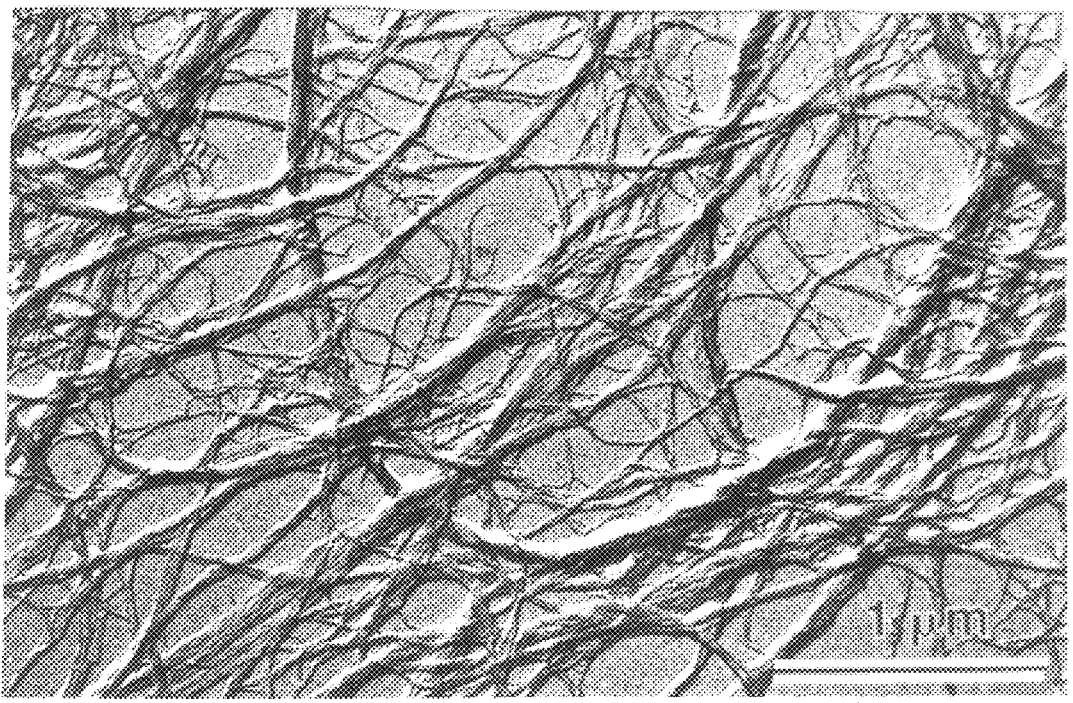
FIG. 5 is a transmission electron microscope photograph of separate microfibrils after homogenization in a Gaulin homogenizer (6 passes)

In the homogenizer, the purified suspension was pushed into a pipe by a piston at high velocity then passed through a small diameter orifice in which the suspension was subjected to a large pressure drop and then thrown against an impact ring. Combining these two phenomena (pressure drop and decelerating impact) produced a shearing action and separation of the cellulose microfibrils. By passing the suspension through the orifice several times, a stable suspension of separated cellulose microfibrils was obtained. This was clear from optical or electron microscope observations. FIG. 4 clearly shows the entwined structure of the cellulose microfibrils constituting the primary wall of the parenchyma cells of the sugar beet. In FIG. 5, cellulose microfibrils which are separated from each other to a greater or lesser degree can be seen. This separating effect was a direct consequence of the homogenization treatment in the Gaulin homogenizer.

The treated samples were suspensions of separate microfibrils and had the appearance of a gel.

The cellulose obtained had at least 90% primary walls.

Its crystallinity, observed by X-rays, was 33%.

Electron microscope observation indicated that the average cross-section of the microfibrils was 2 to 4 nm; they were more than 7 μm long and could be 15–20 μm long.

EXAMPLE 13
Effect of Homogenization (Time)

Figure 6:
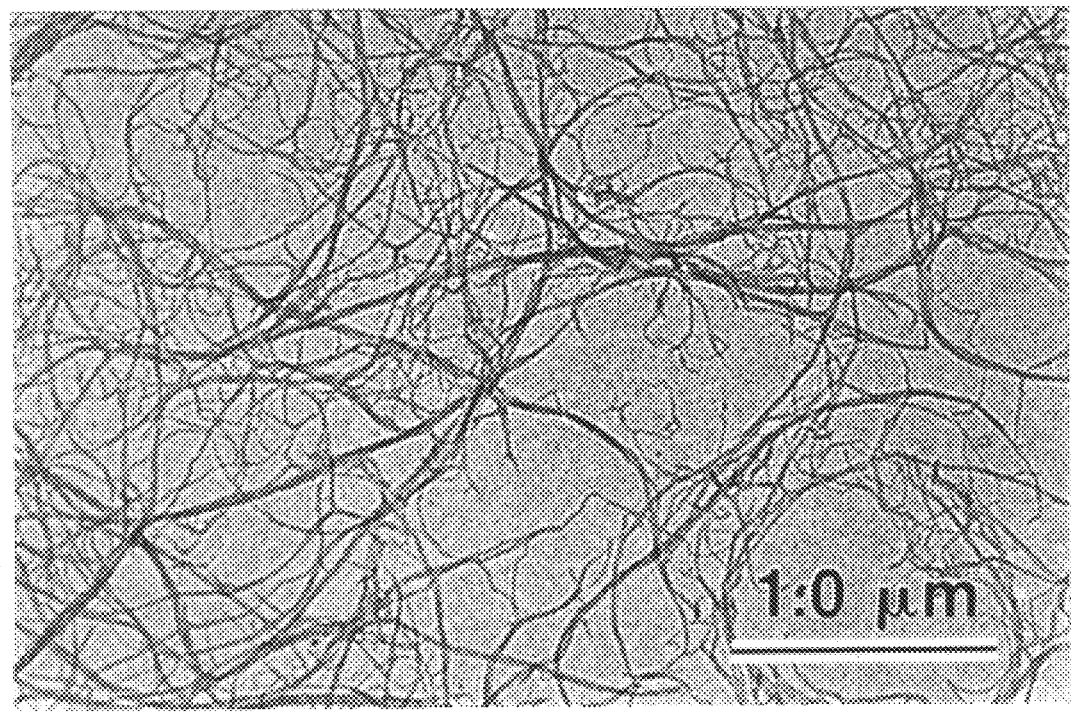
FIG. 6 is a transmission electron microscope photograph of separate microfibrils after homogenization in a Gaulin homogenizer (10 passes).

Sugar beet pulp was treated as described in Example 3, then mixed in a WARING blender for three minutes at high velocity, and then separated into three portions. The first portion was kept as it was, the second was passed 6 times through a GAULIN homogenizer at 50 MPa, and the third was subjected to 10 passes at 50 MPa. FIG. 6 shows the separate microfibrils after 10 passes through a GAULIN homogenizer.

These suspensions were studied with a CARRI-MED CSL50 rheometer with a right cone geometry. The yield point corresponded to the minimum stress applied to obtain a viscosity value directly related to the gel strength. The suspension obtained was also characterized by the viscosity at a shear rate of $57.6\ s^{-1}$. The results obtained for the three suspensions studied at a concentration of 1% are shown in Table II.

TABLE II

| | Rheological characteristics of suspensions at yield | | |
|---|---|---|---|
| Sample | Number of passes | $\sigma_0$ (Pa) | $\eta$ (MPa · s) at 57.6 s$^{-1}$ |
| 1 | 0 | 1.4 | 16 |
| 2 | 6 | 4.3 | 186 |
| 3 | 10 | 7.6 | 328 |

It is clear that the effect of homogenization, due to separation of the cellulose microfibrils, caused considerable improvement of the rheological characteristics. The characteristics of the microfibrils were similar to those of Example 12, apart from the percentage of primary walls being 90%.

EXAMPLE 14
Stability of Suspensions

An important characteristic of the suspensions obtained in Example 12 was their ability to form stable suspensions.

Such suspensions treated in accordance with Example 12 were stored for several months at concentrations of 0.1% to 7% without ever producing a settling volume less than 95%.

EXAMPLE 15
Stability of Suspensions

A suspension of cellulose microfibrils treated in accordance with Example 12 was treated with a solution of 0.1 M trifluoroacetic acid for 2 hours at 20° C.

Analysis of the neutral sugars using the corresponding alditol acetates gave a cellulose percentage of 95%. The suspension obtained was not stable.

Trifluoroacetic acid causes preferential hydrolysis of pectins and hemicelluloses. A loss of stability was thus observed in correlation with hydrolysis of the pectins and hemicelluloses.

This example clearly shows that the stability of these suspensions is due to the presence of pectins and hemicelluloses bonded to the cellulose microfibrils.

EXAMPLE 16
Take up into Suspension

A sample prepared in accordance with Example 12 was oven dried in a flat bottomed polyethylene receptacle. After 12 hours at 100° C., a film of dry cellulose was obtained. This film (0.2 g) was soaked in 10 ml of water at room temperature (25° C.) and gently rubbed with a glass rod. After 30 minutes, a thick paste was obtained. Diluting this paste with water produced a suspension of cellulose microfibrils with identical properties to those of the starting suspension.

EXAMPLE 17
Take up into Suspension

A sample prepared in accordance with Example 12 was oven dried in a flat bottomed polyethylene receptacle. After 12 hours at 100° C., films of dry cellulose were obtained. These films were cut into strips and placed in a WARING blender with deionized water. After 15 minutes agitation, these strips had disintegrated to produce a suspension of cellulose microfibrils with analogous properties to those of the starting suspension.

EXAMPLE 18 (comiparative)
Take up into Suspension

Samples prepared in accordance with Example 12 were oven dried at 60° C. for 12 hours. Films of cellulose were obtained which were treated with trifluoroacetic acid as in Example 15. The treated films were then taken into suspension in water.

These samples were difficult to disperse and did not recover the initial properties of the cellulose.

This example demonstrates that an uncharged cellulose (which is outside the scope of the present invention) cannot in practice be taken up into suspension after dehydration without significant deterioration of its rheological properties.

EXAMPLE 19
Reactivity

The cellulose of the invention, prepared in accordance with Example 12, was incubated with an enzymatic mixture of Trichoderma reesei CL-847. 810 mg of the cellulose of the invention was taken up into suspension in 30 ml of distilled water in a conical flask. Stirring produced a homogeneous suspension of cellulose microfibrils which was equilibrated at 50° C. for 15 minutes. The enzymatic solution was prepared by dissolving 31.10 mg of enzyme (corresponding to 25 FPU/g of cellulose) in 15 ml of sodium citrate buffer with a pH of 4.8. The solution was added to the reaction medium which was incubated at 50° C. with horizontal agitation at 50 oscillations per minute. After 4 hours, 8 hours and 24 hours of reaction, 3 ml of the homogeneous reaction medium was removed (so as not to alter the concentration) and heated under reflux at 100° C. for 20 minutes in a conical flask to denature the enzymes and thus stop the enzymatic reactions. It was centrifuged for 10 minutes at 10,000 g and then filtered through a microporous cellulosic membrane with a 0.45 $\mu$m pore size. Analysis was carried out using HPLC and glucose and cellobiose standards. It was seen that the cellulose of the invention was rapidly hydrolyzed by the enzymatic mixture to give 0.45 mg of reducing sugars (glucose and cellobiose) per mg of starting cellulose after 4 hours of hydrolysis, 0.58 mg per mg of starting cellulose after 8 hours of hydrolysis and 0.85 mg per mg of starting cellulose after 24 hours of hydrolysis.

EXAMPLE 20
Optimization of Process for Production of Microfibrillated Cecellulose from Sugar Beet Pulp on Industrial Pilot Plant Dehydrated sugar beet pulp was taken into suspension in a caustic soda solution with a concentration between 1.5% and 2% by weight with respect to the total liquid.

The quantity of water required was such that the liquid/solid weight ratio was about 15 (1 kg of pulp in 15 kg of water).

Taking into suspension was carried out in a tank with agitation. The resulting suspension was heated to 80° C. for 2 hours.

The solid fraction of the suspension was then separated from the liquid fraction by passage through a centrifugal dryer with a mesh size of less than 250 $\mu$m. The cake was rinsed during centrifuging.

The recovered cake was taken up into suspension in a new 1.5% caustic soda solution in a liquid/solid (DM) ratio which was identical to the above.

Again, the resulting suspension was heated to 80° C. for 2 hours, with agitation.

Drying was carried out again, this time using a finer mesh (25–100 $\mu$m), and the cake was rinsed with water.

The cellulose cake was then taken up into suspension in a 3.5 g/l sodium chlorite solution with the pH adjusted to 4–5 using 33% HCl . The liquid/solid (DM) ratio of this suspension was again about 15.

The bleached cellulose was then recovered by centrifuging with a 10–30 $\mu$m mesh.

The cake was rinsed and centrifuged until a clear filtrate was obtained.

The cellulose obtained was then diluted again in water to produce a dry matter content between 3% and 4%. The suspension was then passed into a FRYMA mixing mill to rupture the cell walls and "prehomogenize" the product.

The ground cellulose was then homogenized in an APV GAULIN homogenizer at a pressure between 450 bars and 550 bars. The product was preheated to a temperature of more than 95° C. so that the product was boiling as it passed through the orifice. The aim of this was to cause cavitation.

The product underwent 3 to 10 passes depending on the desired degree of homogenization.

The cellulose was then concentrated to a dry matter content of more than 35% by passage through a LAROX or CHOQUENET type filter press.

EXAMPLE 21
Comparative Viscosity of Suspensions Before and After Drying

Cellulose was prepared as in Example 20.

Samples N° 1 and N° 2 were prepared as follows.

The cellulose was pressed to 40% dry matter then dried to 60% (sample N° 1) and to 85% (sample N° 2).

The two samples were then dried in a conditioning chamber at 20° C. and 50% relative humidity and were then ground for 30 seconds in a coffee grinder before being taken up into suspension (2% dry matter) using the ULTRA TURRAX for 2 minutes.

The control was 2% dry matter cellulose homogenized using the ULTRA TURRAX for 2 minutes.

The viscosities of samples N° 1 and N° 2 and the control were measured after standing for 4 hours (due to the thixotropic nature of the cellulose) using a HAAKE VT 500 viscosimeter, an apparatus for measuring $MV_{II}$, with a shear rate of $1.8\ s^{-1}$.

The following results were obtained:

Viscosity of control: 25 Pa.s

Viscosity of sample N° 1: 25 Pa.s

Viscosity of sample N° 2: 22 Pa.s

Thus the cellulose of the invention when dried to 60% dry matter recovered 100% of its viscosity and when dried to 85% dry matter recovered 90% of its viscosity.

The cellulose of the present invention is thus distinguished from the cellulose of ITT INDUSTRIES patent EP 120 471 which only recovers a maximum of 2% to 20% of its initial viscosity without additives and requires the addition of at least 100% by weight with respect to the cellulose of an additive to recover almost all of its initial viscosity.

EXAMPLE 22
Extraction of Potato Pulp Cellulose (after extraction of starch)

Purification of potato pulp

Potato pulp, from which starch had been extracted, was taken up into suspension in deionized water. For better hydration, a WARING blender type mixer provided with a four blade screw was used, and intermittent mixing was carried out for 45 minutes. The suspension was rendered alkaline by addition of a caustic soda solution with a concentration adapted to obtain a final concentration of 2% by weight caustic soda and 2.5% dry matter by weight, both with respect to the total liquid. The suspension was heated to 80° C. for 2 hours with constant mechanical stirring. After this treatment, it was filtered through a 0.6 mm screen. The solid residue was washed with water until a neutral filtrate was obtained. This alkaline treatment was carried out a second time. The solid residue was washed with water until a neutral filtrate was obtained.

After washing, the solid residue was taken up into a 2.5% suspension in a 3.4 g/l sodium chlorite ($NaClO_2$) solution, buffered to a pH of 4.9 by a mixture of caustic soda and acetic acid. This solution was heated to 70° C. for 3 hours with constant mechanical stirring. The suspension was then filtered through a stainless steel screen and then rinsed with water to produce a colorless filtrate. A cellulosic residue with 3% to 5% by weight dry matter was obtained by filtering under reduced pressure using a BÜCHNER funnel.

Chemical analysis of the resulting cellulosic residue indicated 93% of glucose. The average degree of viscosimetric polymerization was in the order of 1,000.

Homogenization

Homogenization was carried out as described in Example 12.

Stability of suspensions

Suspensions of microfibrils from potato pulp obtained using the above protocol were stable.

Viscosity of suspensions

For a 0.3% dry matter suspension:

Brookfield: 250 MPa 30 rpm, needle n° 2

EXAMPLE 23

Extraction of Carrot Cellulose 1 kg of 10% DM carrots (i.e. 100 g of dry matter) was grated. The grated carrot was taken up into suspension in a caustic soda solution to obtain a mixture of 100 g of dry matter in 2 liters of 2% caustic soda solution.

The suspension was heated to 90° C. for 2 hours with mechanical stirring. After this treatment, liquid/solid separation was carried out by centrifuging. The solid residue was rinsed. It was then taken up into suspension in a 1.5% caustic soda solution with a liquid/solid ratio of 15.

The mixture was centrifuged again and the solid residue was recovered and rinsed.

After homogenization as described in Example 12, a suspension was obtained which was stable in water and had the appearance of a gel.

While the process of the present invention has been described and illustrated with reference to sugar beet, potato and carrot pulp, it can also be applied to the treatment of any parenchyma, for example any citrus fruits (lemons, grapefruit, oranges) and most other fruits and vegetables.

We claim:

1. A microfibrillated cellulose containing at least 80% of primary walls and wherein the primary walls are charged with or contain uronic acids.

2. The microfibrillated cellulose according to claim 1 containing at least about 85% of primary walls.

3. The microfibrillated cellulose according to claim 1 wherein the uronic acids are selected from the group consisting of galacturonic acid and glucuronic acid.

4. The microfibrillated cellulose according to claim 1 wherein the cellulose has a crystallinity of 15% to 50%.

5. The microfibrillated cellulose according to claim 1 wherein the cellulose comprises microfibrils with a cross-section between about 2 nm and about 4 nm.

6. A process for the preparation of microfibrillated cellulose from primary wall plant pulp containing cellulose, pectins, hemicelluloses, proteins and mineral materials, the process comprising the following steps:

(a) hydrolyzing the pulp with acid or base at a temperature between about 60° C. and 100° C. partially to extract the pectins and hemicelluloses to form a suspension;

(b) recovering a solid residue from the suspension from step (a);

(c) carrying out, under alkaline conditions, a second extraction of the residue of cellulosic material from step (b), when step (a) is an acidic hydrolysis and recovering the cellulosic material residue by separating the suspension;

(d) washing the residue from step (b) or step (c);

(e) diluting the cellulosic material from step (d) in water to obtain between 2% and 10% dry matter;

(f) homogenizing the cell suspension from step (e) wherein at least one alkaline extraction step is carried out on the cellulosic material, said alkaline extraction being carried out with a base at a concentration less than about 9% by weight, and the homogenizing step (f) is carried out by a high mechanical shear operation to provide a cell suspension, passing the cell suspension through a small diameter orifice, subjecting the suspension to a pressure drop of at least 20 MPa and to a high velocity shearing action followed by a high velocity decelerating impact.

7. A process according to claim 6 wherein step (a) hydrolysis is at a temperature between about 70° C. and 95° C.

8. A process according to claim 7, wherein step (a) hydrolysis is at a temperature of about 90° C.

9. A process according to claim 6 wherein in each alkaline extraction step a base selected from the group consisting of caustic soda and potash is used.

10. A process according to claim 6 wherein the concentration of the base used for each alkaline extraction step is in the range from about 1% to about 6% by weight.

11. A process according to claim 6 wherein an additive selected from the group consisting of dispersing agents, suspending agents and thickening agents which are soluble in water is added to the suspension to be homogenized in step (f).

12. A process according to claim 6 wherein the homogenization step (f) is at a temperature between 95° C. and 120° C.

13. A process according to claim 6, wherein before step (a), the dehydrated pulp is ground and screened and retaining the fraction with a granulometry between about 20 $\mu$m and about 1,000 $\mu$m.

14. A process according to claim 6 wherein after washing step (d) or after bleaching the cellulosic suspension is moderately ground wet followed by filtering with a screen mesh between about 20 $\mu$m and about 75 $\mu$m.

15. A process according to claim 6, wherein cellulose resulting from homogenization step (f) is concentrated.

16. A process according to claim 15 wherein the cellulose is concentrated to more than about 50% dry matter.

17. A process according to claim 15 wherein the cellulose is concentrated by pressing, filtering or low temperature and controlled humidity drying.

18. A process according to claim 6 wherein the homogenization of step (f) is followed by a high shear operation.

19. A process according to claim 6 wherein the plant pulp is saccharose-extracted beet pulp.

20. A process according to claim 6 including the step of bleaching the cellulosic material after step (d) to provide a suspension of cellulosic material and recovering the cellulosic material by separating said cellulosic material from the suspension.

21. A process according to claim 20 wherein the material is bleached with an oxidizing treatment with ozone or hydrogen peroxide.

22. A process according to claim 21 wherein the ozone or hydrogen peroxide is used in the bleaching.

23. A process according to claim 6, wherein the dehydrated pulp is ground and screened and retaining the fraction with a granulometry between about 75 $\mu$m and 600 $\mu$m.

24. A process according to claim 6 wherein the high-shear operation is mixing or grinding.

\* \* \* \* \*